United States Patent
Deng et al.

(10) Patent No.: US 9,592,811 B2
(45) Date of Patent: Mar. 14, 2017

(54) ELECTRO-HYDRAULIC BRAKE SYSTEM WITH ELECTRIC POWER ASSIST AND BY-WIRE BRAKING

(71) Applicant: Yangzhou Taibo Automotive Electronics Intelligent Technology Company, Ltd

(72) Inventors: Weiwen Deng, Irvine, CA (US); Nenggen Ding, Beijing (CN)

( * ) Notice: Subject to any disclaimer, the term of this patent is extended or adjusted under 35 U.S.C. 154(b) by 66 days.

(21) Appl. No.: 14/658,178

(22) Filed: Mar. 14, 2015

(65) Prior Publication Data

US 2016/0264117 A1    Sep. 15, 2016

(51) Int. Cl.
*B60T 13/74* (2006.01)
*B60T 7/04* (2006.01)
*B60T 11/18* (2006.01)
*B60L 7/26* (2006.01)

(52) U.S. Cl.
CPC .............. *B60T 13/745* (2013.01); *B60L 7/26* (2013.01); *B60T 7/042* (2013.01); *B60T 11/18* (2013.01)

(58) Field of Classification Search
CPC ........ B60T 13/745; B60T 11/18; B60T 7/042; B60L 7/26
See application file for complete search history.

(56) References Cited

U.S. PATENT DOCUMENTS

| | | | | |
|---|---|---|---|---|
| 4,237,772 A | * | 12/1980 | Peeples | B60T 13/144 91/391 R |
| 6,164,183 A | * | 12/2000 | Fulks | B60T 8/4854 91/367 |
| 8,573,708 B1 | * | 11/2013 | Goodzey | B60T 7/042 303/151 |
| 2008/0284242 A1 | * | 11/2008 | Ganzel | B60T 7/12 303/114.1 |
| 2014/0014451 A1 | * | 1/2014 | Nakata | B60T 1/10 188/358 |
| 2014/0331666 A1 | * | 11/2014 | Zhang | B60T 13/745 60/545 |
| 2016/0264114 A1 | * | 9/2016 | Maruo | B60T 11/18 |

FOREIGN PATENT DOCUMENTS

CN    203511632 U  *  4/2014

* cited by examiner

*Primary Examiner* — Aaron L Troost
*Assistant Examiner* — Thomas Ingram
(74) *Attorney, Agent, or Firm* — William C. Lin, PLC

(57) ABSTRACT

An electro-hydraulic brake (EHB) system of a vehicle, the vehicle is equipped with brake pedal, brake pushrod, wheel cylinders, brake pedal sensors, on-board vehicle sensors. The EHB system includes a manual boost cylinder, an electric power assist assembly and a master cylinder. The manual boost cylinder includes a sliding cylinder body, a large piston and a small piston. The manual boost cylinder also include interlocking means that selectively operate on locking or unlocking between the sliding cylinder body, the small piston and the large piston based on a plurality of positions of the small piston within the manual boost cylinder body. The electric power assembly includes an electric motor, a pinion gear and a rack and a master cylinder. The master cylinder includes a first piston, a second piston and limiter means.

11 Claims, 13 Drawing Sheets

ELECTRO-HYDRAULIC BRAKE SYSTEM WITH ELECTRIC POWER ASSIST AND BY-WIRE BRAKING

CROSS-REFERENCE TO RELATED APPLICATIONS

Field

The present invention relates to vehicle brake system, and more particularly to an integrated brake system with functionalities of electric power assist and by-wire braking operations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle braking systems have gone through a long way of evolution from the very primitive leather frictional brake to drum brake, disc brake and coming to brakes with vacuum boost, electric power assist, as well as antilock braking system (ABS), including a brake master cylinder with central valves for good ABS performance yet not without high costs. Recent development of vehicle brake systems results in various brake-by-wire (BBW) systems, which include electro-hydraulic brake (EHB) system and electro-mechanical brake (EMB) system.

With respect to power boost of vehicle brake systems, most of the systems adopt vacuum boost and some few systems adopt electric power assist. While the electric power assist can provide a more precise control of vehicle braking over the vacuum boost counterpart, it suffers a short-coming that the manual part of the braking operation cannot be disconnected from the driver. This functional limitation prevents the braking system operation from reaching its optimal performance when regenerative braking is desired in the vehicle.

The brake-by-wire systems have various performance advantages over traditional brake systems not only in improvement of braking efficiency, braking stability and consistency, this type of system is also a necessary element for modern dynamic chassis control and new-energy vehicle braking system, especially the regenerative braking. Furthermore, the brake-by-wire system provides two critical functionalities that traditional power-assisted brake is completely lacking: (1) the BBW system can provide active braking to perform full or partial vehicle braking without depression of the brake pedal by the driver, and (2) on the other hand, with the BBW system, driver's depression of the brake pedal does not necessarily activate vehicle friction brake. These two functionalities make the BBW system superior over traditional power-assisted brake system in advanced vehicle chassis dynamic features such as acceleration slip control (ASR), electronic stability enhancement control (ESC), adaptive cruise control (ACC), and many others. However, the BBW systems arrive at these performance advantages at the expenses of system complexity and costs.

While the BBW systems offers performance superiority over the traditional power assisted brake systems, so long as the manual braking is disconnected with the by-wire braking, system fail-safe performance must become of the highest concern. The BBW systems rely on sophisticated electronic sensing and signal processing to prevent disaster from happening, including implementation of full-time monitoring and continuous self diagnosis of the system to assure a healthy system performance and avoid dangers to vehicle personnel upon system fault or failure. However, complexity of system configuration and high costs are often associated with such designs.

While there are a few different forms of BBW systems available in various platforms of automobiles, each of them has its unique performance or functional limitations. For example, in the various configurations of the EHB type BBW system, a high-pressure accumulator is needed. During the braking operation hydraulic pressure may be channeled to a master cylinder to push a piston to create pressure to vehicle wheel cylinders; or, alternatively, the hydraulic pressure may be channeled directly to the wheel cylinders. The high-pressure accumulator needs to be replenished to maintain the required hydraulic pressure even when the vehicle braking is not in action, and it may even incur risk of leakage during an accident imposing safety threats to personnel. In addition, in order to provide a good pedal feel for the driver, complicated mechanism of brake pedal simulator is often required in EHB.

In contrast with EHB, the EMB applies pressure to brake pads directly via mechanical amplification of motor torque without hydraulic circuit mechanism; thus eliminating the need of the high-pressure accumulator and hydraulic lines. However, such systems require complicated mechanical energy conversion structure to provide the required braking force. Moreover, reliability of the EMB fail-safe capability is still a challenge to many automotive manufacturers. It should also be noted that EMB system is not compatible with traditional braking mechanism. Once EMB is decided to be the vehicle brake system, all components of the vehicle brake system need to be re-designed anew, resulting in a much higher cost.

Therefore, it is the objective of the present invention to provide an electro-hydraulic brake system that possesses the two functionalities of vehicle braking that cannot be materialized in any of the state-of-the-art braking system: an electric power assist for braking operation keeping the driver in the loop and a brake-by-wire braking operation independent of driver's brake pedal command. The present invention thus demonstrates the following features:

Advantageously, the present invention of the EHB system is capable of performing both functionalities of electric power assist braking and by-wire braking operation. This EHB system possesses advantages of a non-BBW system in high degree of reliability and natural brake pedal feel, as well as advantage of a by-wire braking system in performing active braking operation;

Advantageously, the present invention of the EHB system allows a complete decoupling between the brake pedal and frictional brake during a small pedal-travel braking operation. Therefore, it can satisfy the blending requirements of regenerative braking and friction braking in most operating conditions, resulting in a maximum recovery of regenerative braking energy;

Advantageously, the present invention of the EHB system provides electric power assist during a large brake-pedal travel braking condition. With a feature of a force amplification by a manual boost cylinder, electric motor of a smaller power rating may be used compared with other EHB of prior art;

Advantageously, the present invention of the EHB system has a natural fail-safe function that does not require an additional mechanism for fail-safe braking operation;

Advantageously, the present invention of the EHB system has a natural brake-pedal feel function that does not require an additional mechanism to implement the brake-pedal feel simulator;

Advantageously, the present invention of the EHB system can provide a good brake pedal feel using active pressure control via precise torque control of the electric motor to eliminate an impact on the low-pressure chamber of the master cylinder without the need of a high-cost hydraulic mechanism;

Advantageously, the present invention of the EHB system allows use of traditional brake components and the traditional master cylinder with two pressure chambers in series; thus reducing the system manufacturing cost with enhanced system performance; and Advantageously, the present invention of the EHB system allows the use of the electric motor to provide active brake control without the need of any part of pressurizing mechanism of a hydraulic control system; thus reducing the system manufacturing cost with enhanced system performance.

SUMMARY

An electro-hydraulic brake (EHB) system with electric power assist and by-wire braking functions is devised. This EHB system can operate electric power assist mode, active braking mode, regenerative braking mode and many other modes of vehicle braking operation.

The EHB system includes a brake pedal, a manual boost cylinder, electric power assist assembly, a master cylinder, a brake fluid reservoir. The EHB also includes an electric motor, a worm gear and rod set, a rack and pinion gear set and an electronic control unit (ECU). The EHB may include a brake pedal position sensor, a master cylinder pressure sensor, hydraulic control unit (HCU), wheel cylinders and other on-board vehicle sensors.

The manual boost cylinder may include a manual boost cylinder body, a pushrod, a small piston, a sliding cylinder body, a large piston, a large piston rod, a large piston returning spring, a sliding cylinder body returning spring, a locking pin, a locking pin pressure spring, and a spring seat. The sliding cylinder body is located inside the manual boost cylinder, the small piston is located inside the sliding cylinder body and is rigidly connected with the pushrod. The large piston is located within the sliding cylinder body and is rigidly connected with the large piston rod.

The large piston returning spring is located between the large piston and the front end of the manual boost cylinder. The sliding cylinder body returning spring is located between the sliding cylinder body and the front end of the manual boost cylinder. A hydraulic pressure chamber is formed between the small piston, the large piston and the sliding cylinder body. As the brake pedal is at the undepressed position the hydraulic pressure chamber is in fluid communication with the brake-fluid reservoir through a compensation orifice. The locking pin is located across the wall of the sliding cylinder body, and makes surface contact with the small piston with pressure exerting against the small piston by the locking pin pressure spring.

The electric power assist assembly includes an electric motor, a coupling, a worm rod, a worm gear, a pinion gear, a rack, a push bar, a rubber spring and an assembly housing. The output shaft of the electric motor is connected with the worm rod via the coupling, and the worm rod and the worm gear are meshed together. The worm gear and the pinion gear are installed on a same axis, the pinion gear and the rack mesh together. The rack and the push bar are connected together via gear thread. The rack can move reciprocably within the electric power assist assembly housing. The rack has a rear opening where the rubber spring is installed inside.

The master cylinder includes a master cylinder body, a first piston, a second piston, a first piston returning spring, a second piston returning spring. The front part of the first piston is located inside the master cylinder, and the rear part of the first piston is located outside the rear opening of the master cylinder. The second piston is located inside the master cylinder. A first high-pressure chamber is formed between the first piston and the second piston. A second high-pressure chamber is formed between the second piston and the front end of the master cylinder. A first piston returning spring is located between the first piston and the second piston. A second piston returning spring is located between the second piston and the front end of the master cylinder. A sealing ring is installed between the first piston and the rear end of the master cylinder.

The brake pedal is connected with the pushrod via a support pin. The brake fluid reservoir is in fluid communication with the first high pressure chamber and the second high pressure chamber of the master cylinder. The first and second high pressure chambers are in fluid communication with the hydraulic control unit (HCU) via brake lines. The HCU is in fluid communication with the four wheel cylinders of the vehicle via brake lines. The electric motor and the HCU are electrically connected with the vehicle ECU. The ECU is also electrically connected with the brake pedal position sensor and the master cylinder pressure sensor. The brake pedal position sensor is installed on the brake pedal to acquire the brake pedal position signal. The master cylinder pressure sensor is installed on the master cylinder to acquire the hydraulic pressure signal of the first high pressure chamber or the second high pressure chamber of the master cylinder.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
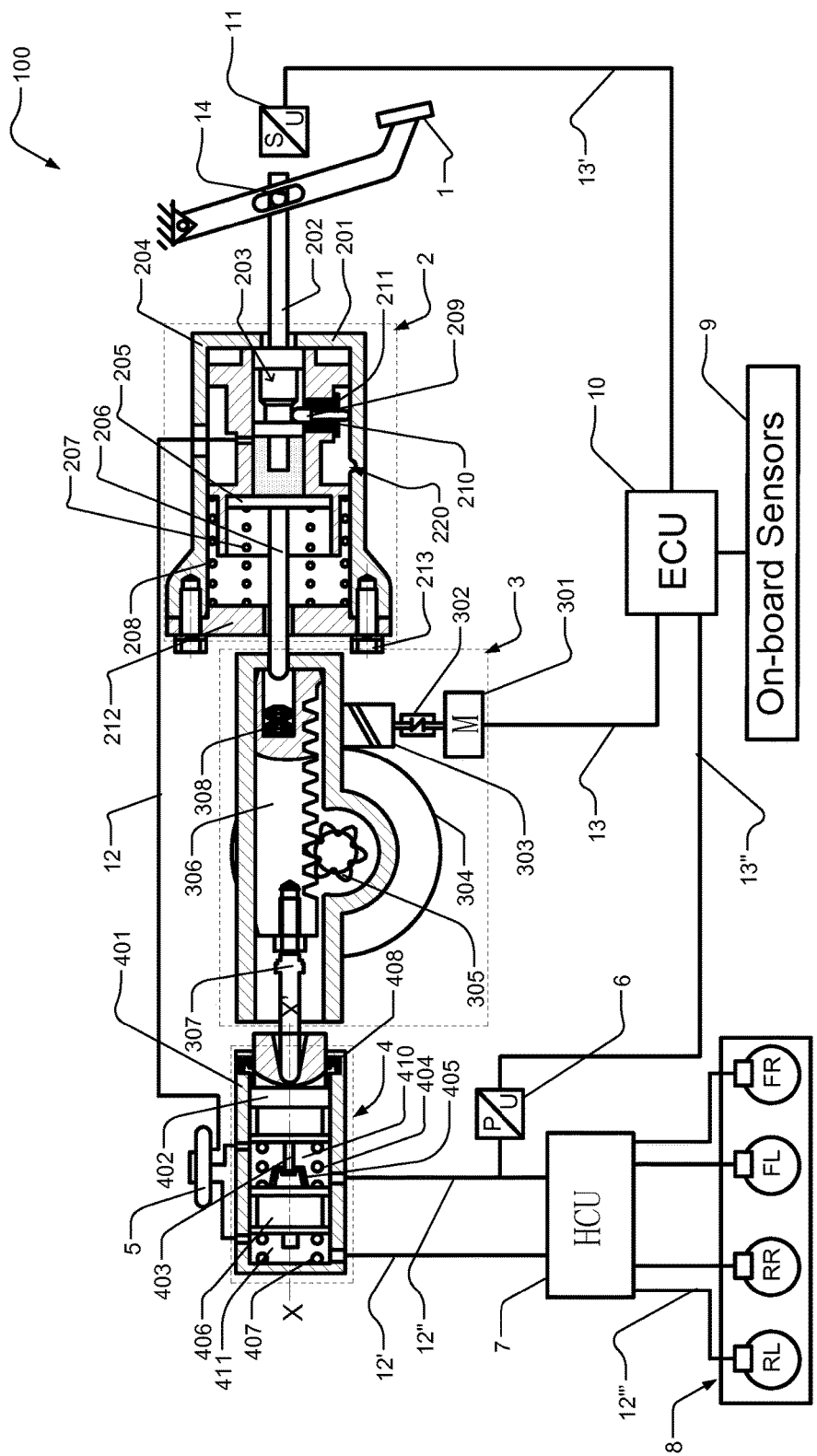
FIG. 1 is a plan view of an electro-hydraulic brake system according to the present invention.

The following description is merely exemplary in nature and is in no way intended to limit the disclosure, its application, or uses. For purposes of clarity, the same reference numbers with or without a single or multiple prime symbols appended thereto will be used in the drawings to identify similar elements. It should be understood that steps within a method may be executed in different order without altering the principles of the present disclosure unless otherwise specified.

Referring now to FIG. 1, a plan view of an electro-hydraulic brake (EHB) system 100 according to the present invention is shown. The system may include a brake pedal 1, a manual boost cylinder 2, an electric power assist assembly 3, a master cylinder 4, a brake fluid reservoir 5, a master cylinder pressure sensor 6, a hydraulic control unit (HCU) 7, four wheel cylinders 8 of the vehicle, on-board vehicle sensors 9, an electronic control unit (ECU) 10 and brake pedal position sensor 11.

The brake pedal 1 may be connected with a pushrod 202 via a support pin 14. The reservoir 5 may be hydraulically connected with a pressure chamber of the manual boost cylinder 2, and also connected with a first high-pressure chamber 410 and a second high-pressure chamber 411 of the master cylinder 4. The first high-pressure chamber 410 and the second high-pressure chamber 411 of the master cylinder 4 may be connected with the hydraulic control unit 7 via brake lines. The HCU 7 and the four wheel cylinders 8 may be connected via brake lines. The electric motor 301 and the HCU 7 may be electrically connected with the ECU 10.

The ECU 10 may be electrically connected with the brake pedal position sensor 11 and the master cylinder pressure sensor 6. The brake pedal position sensor 11 may be installed on the brake pedal 1 to obtain the brake pedal position signal, and the master cylinder pressure sensor 6 may be installed on the master cylinder 4 to obtain the pressure signal of the first high-pressure chamber 410 or the second high-pressure chamber 411 of the master cylinder 4.

Based on the signal from the on-board vehicle sensors, the brake pedal position sensor 11 and master cylinder pressure sensor 6, the ECU 10 may determine various control actions to be performed on the electric motor 301 and the HCU 13. The control actions may include various modes of electro-hydraulic brake system control such as small-pedal-travel by-wire brake control, large-pedal-travel power assist brake control and active brake control, etc.

Figure 2:
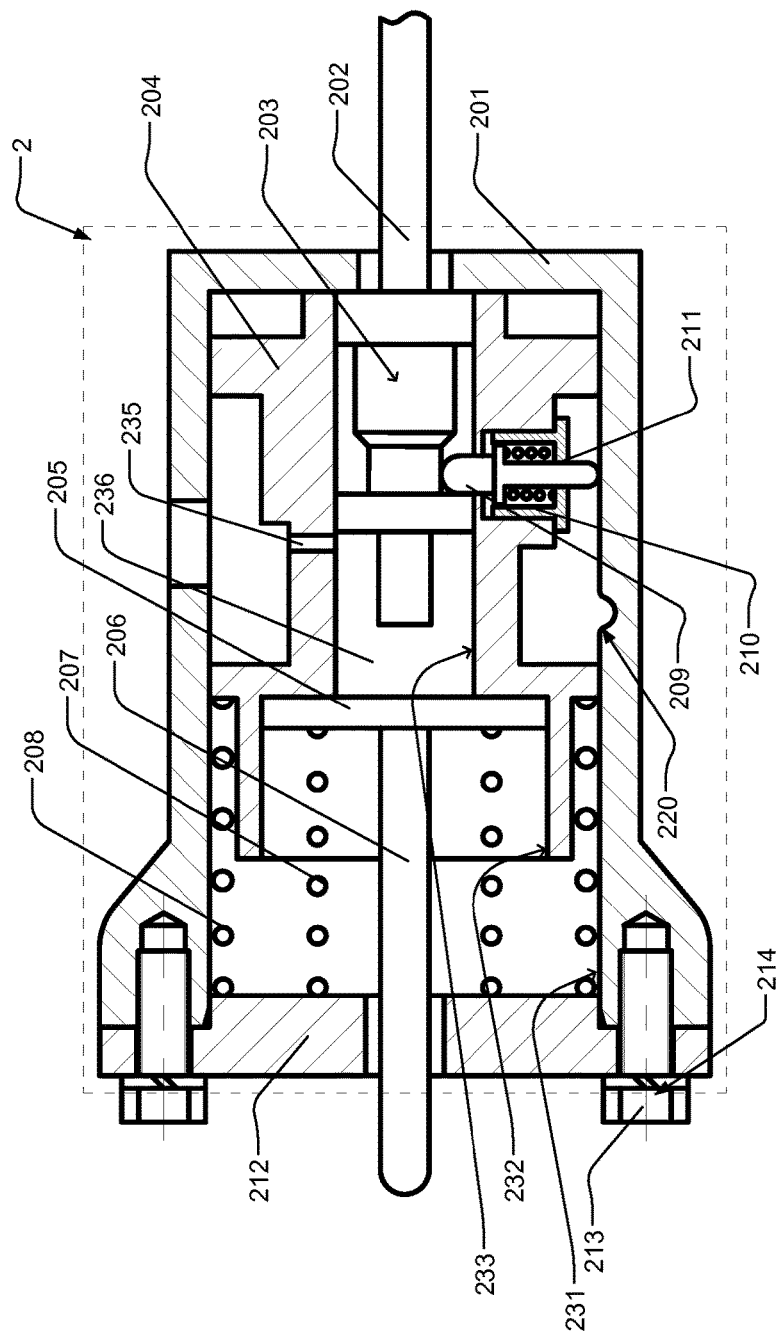
FIG. 2 is an axial cross sectional view of a manual boost cylinder according to the present invention.

Referring now to FIG. 2, an axial cross sectional view of the manual boost cylinder 2 according to the present invention is shown. The manual boost cylinder 2 may include a manual boost cylinder body 201, a pushrod 202, a small piston 203, a sliding cylinder body 204, a large piston 205, a large piston rod 206, a large piston returning spring 207, a sliding cylinder returning spring 208, a locking pin 209, a locking pin pressure spring 210, a spring seat 211. The inner wall 231 of the manual boost cylinder body 201 defines a boost cylinder chamber, and the sliding cylinder body 204 is located inside, and reciprocably movable within the boost cylinder chamber of the master cylinder body 201. The sliding cylinder body 204 may have a front inner wall 232 defining a front cylinder, and a rear inner wall 233 defining a rear cylinder. The small piston 203 is located inside the rear cylinder of the sliding cylinder body 204 and is rigidly connected with the pushrod 202. The large piston 205 is located inside the front cylinder of the sliding cylinder body 204, and is rigidly connected with the large piston rod 206.

The large piston returning spring 207 is located between the large piston 205 and the front end of the manual boost cylinder body 201. The sliding cylinder returning spring 208 is located between the sliding cylinder body 204 and the front end of the manual boost cylinder body 201. The small piston 203, large piston 205 and the sliding cylinder body 204 jointly form a pressure chamber 236. The pressure chamber 236 may be in fluid communication with the reservoir 5 via a compensation orifice 235 on the sliding cylinder body 204.

Figure 2A:
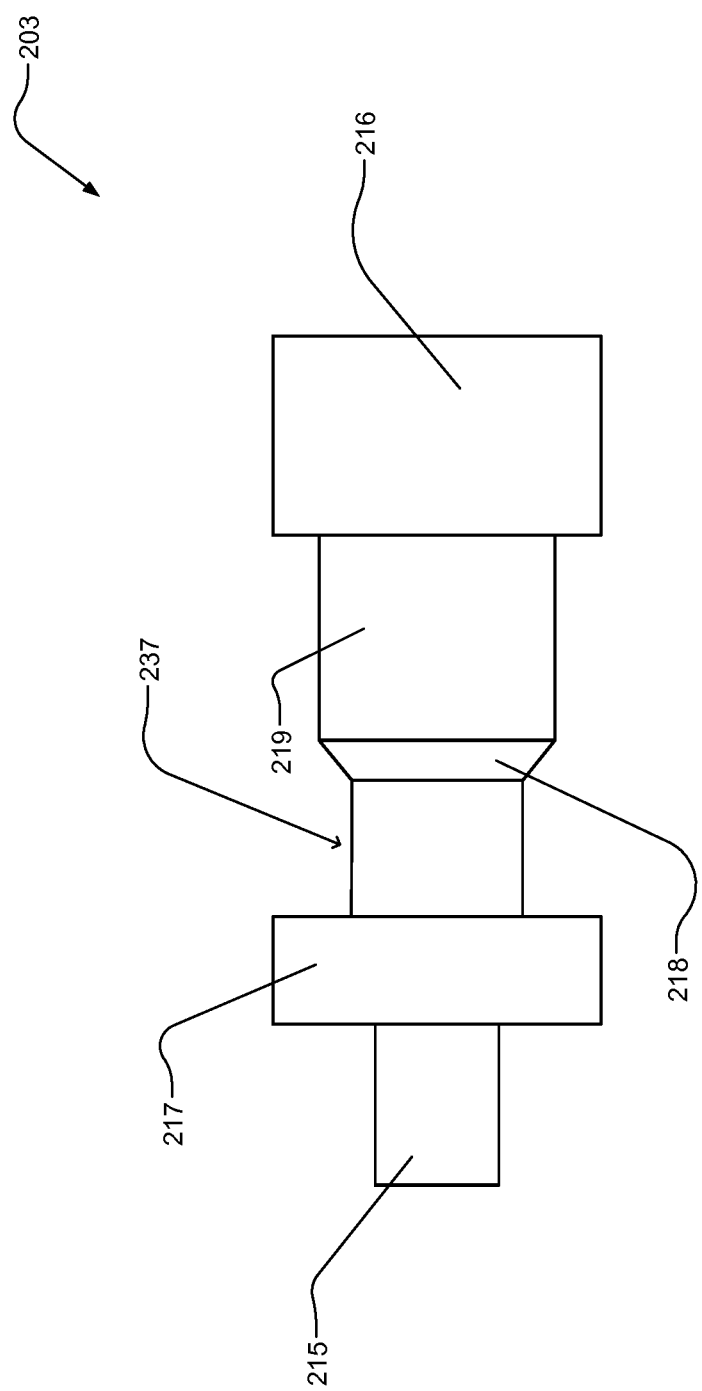
FIG. 2A is an axial cross sectional view of a small piston according to the present invention.

Referring also to FIG. 2A, an axial cross sectional view of the small piston 203 according to the present invention is shown. The small piston 203 may include a tip 215 at the front end of the small piston 203. The small piston 203 may also include a base 216 at the rear end. The small piston 203 may include a disc 217 rigidly connected with the tip 215, and a stem 219 rigidly connected with the base 216. The stem 219 may have a diameter smaller than that of the base 216. At the front end of the stem 219 there may be a bevel ring 218 rigidly connected to the stem 219 to further reduce the diameter to be smaller than that of the stem 219. The area defined between the disc 217, the bevel ring 218 forms a ring slot 237. A locking pin 209 may be movable through the sliding cylinder body 204, and asserting pressure tightly against the small piston 203 at the ring slot 237 via a pressure spring 210.

Figure 3:
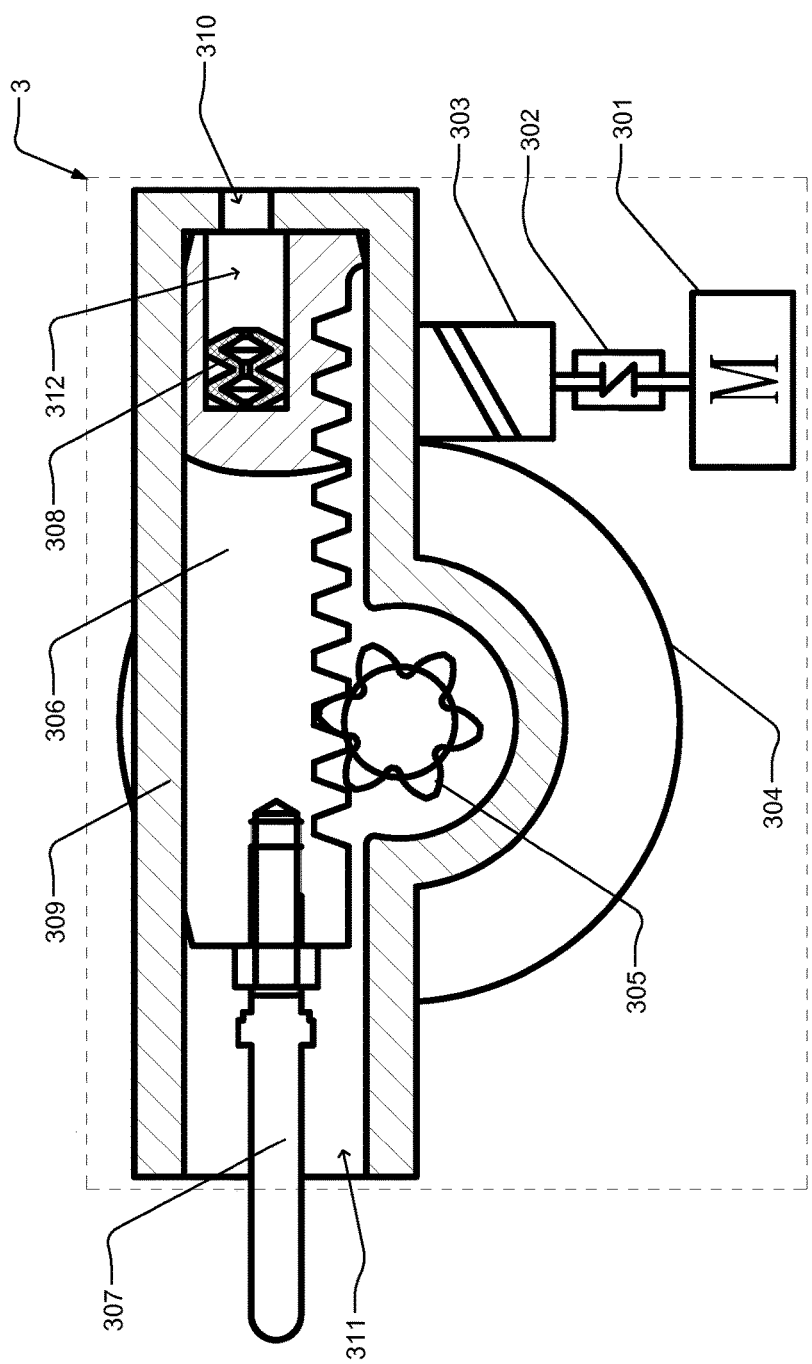
FIG. 3 is an axial cross sectional view of an electric power assist assembly according to the present invention.

Referring now to FIG. 3, an axial cross sectional view of the electric power assist assembly 3 according to the present invention is shown. The electric power assist assembly 3 may include an electric motor 301, a coupling 302 and a worm rod 303. The worm rod 303 is meshed with a worm gear 304, and the worm gear 304 may be rigidly connected with a pinion gear 305 on a same axis. The pinion gear 305 may be meshed with a rack 306. The rack 306 may be located inside a housing 308 of the electric power assist assembly 3. The rear portion of the rack 306 may have a hollow area 312, and a damper spring 308 may be located inside the hollow area 312. In one embodiment, the damper spring 308 may be a rubber spring. The housing 309 may have a rear opening 310 to facilitate the large piston rod 206 of the manual boost cylinder 2 to come into the hollow area 312 of the rack 306 to the extent of pushing against the damper spring 308. The housing 309 may also have a front opening 311 to facilitate a push bar 307 to be connected between the electric power assist assembly 3 and the master cylinder 4.

Figure 4:
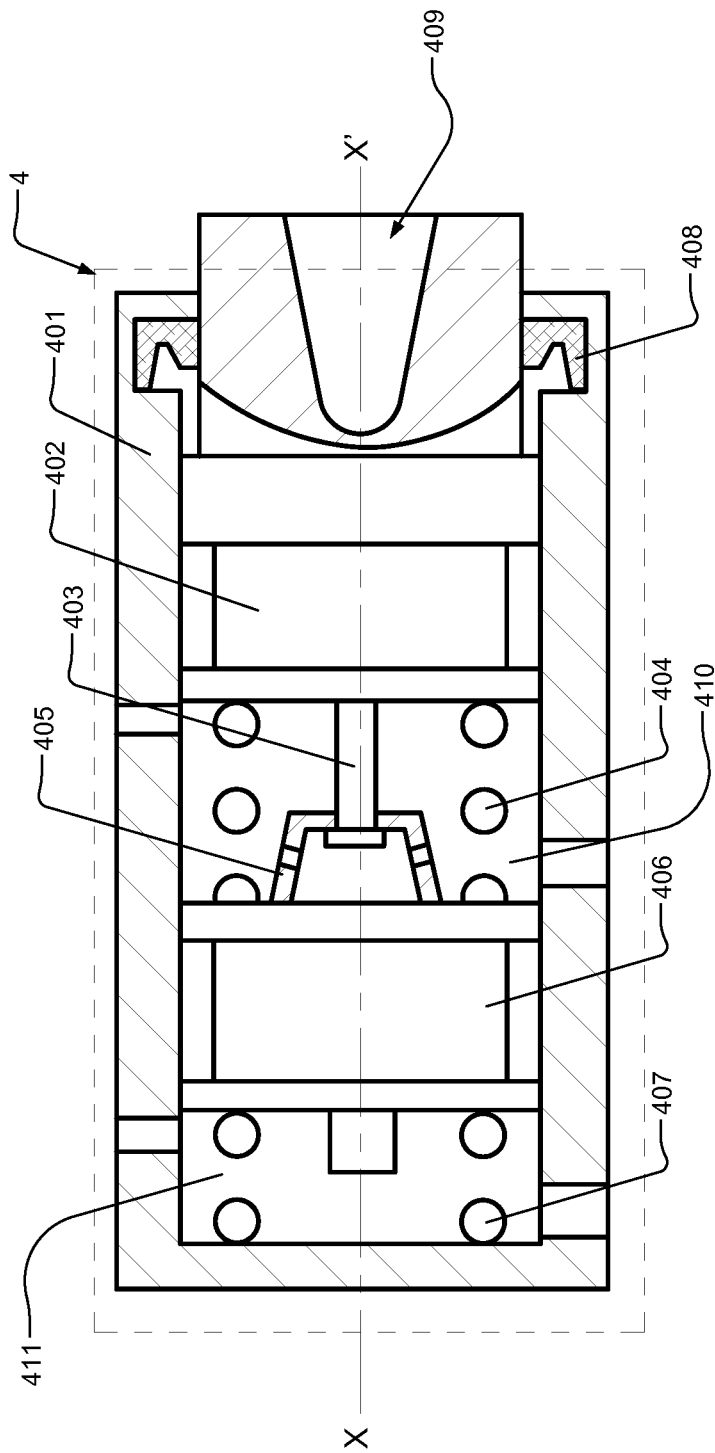
FIG. 4 is an axial cross sectional view of a master cylinder according to the present invention.

Referring now also to FIG. 4, an axial cross sectional view of the master cylinder 4 according to the present invention is shown. The master cylinder 4 may include a master cylinder body 401, a master cylinder first piston 402, a limiter bolt 403, a first piston returning spring 404, a limiter hood 405, a master cylinder second piston 406, a second piston returning spring 407 and a sealing ring 408. Part of the first piston 402 is located outside the master cylinder body 401. The second piston 406 is located inside the master cylinder body 401. A first high-pressure chamber 410 is formed between the first piston 402 and the second piston 406. A second high-pressure chamber 411 is formed between the second piston 406 and the front end of the master cylinder body 401.

The rear end of the first piston 402 may include a cone-shape cavity 409 with a larger opening toward the rear and smaller tip opening toward the front, facilitating the push bar 307 to come in from the electric power assist assembly 3. Forward motion of the push bar 307 may cause the first piston 402 to move forward along the axis X-X' of the master cylinder body 401 even though the push bar 307 may not be perfectly in line with the axis X-X'. A sealing ring 408 may be installed between the first piston 402 and the master cylinder body 401.

A first piston returning spring 404 may be included between the first piston 402 and the second piston 406. The first piston returning spring 404 may be in contact with the first piston 402 and the second piston 406, exerting pressure to both pistons. A second piston returning spring 407 may be included between the second piston 406 and the front end of the master cylinder body 401, making contact with the second piston 406.

Limiting means for restricting the volume of the first high-pressure chamber 410 may be installed between the first piston 402 and the second piston 406. In one embodiment, the limiting means may include a limiter bolt 403 and a limiting hood 405. The limiter bolt 403 may be rigidly connected to the front end of the first piston 403 along the axis X-X' extending toward the direction of the second piston 406. The limiter hood 405 may be rigidly connected to the rear end of the second piston 406 in line with the axis X-X' facing toward the direction of the first piston 402. The head of the limiter bolt 403 is located within the inner space defined by the limiter hood 405. As a result, the length of the limiter bolt 403 defines the minimum volume of the first high-pressure chamber 410 when the first piston 402 is pushed to close the gap between the two pistons, and the height of the limiter hood 405 combined with the length of the limiter bolt 403 defines the maximum volume of the first high-pressure chamber 410 when the first piston 402 and the second piston 406 are pushed apart from each other. The limiter hood 405 may be made of a structure that facilitates free fluid communication without obstruction between the inside and outside of the limiter hood 405.

Figure 5:
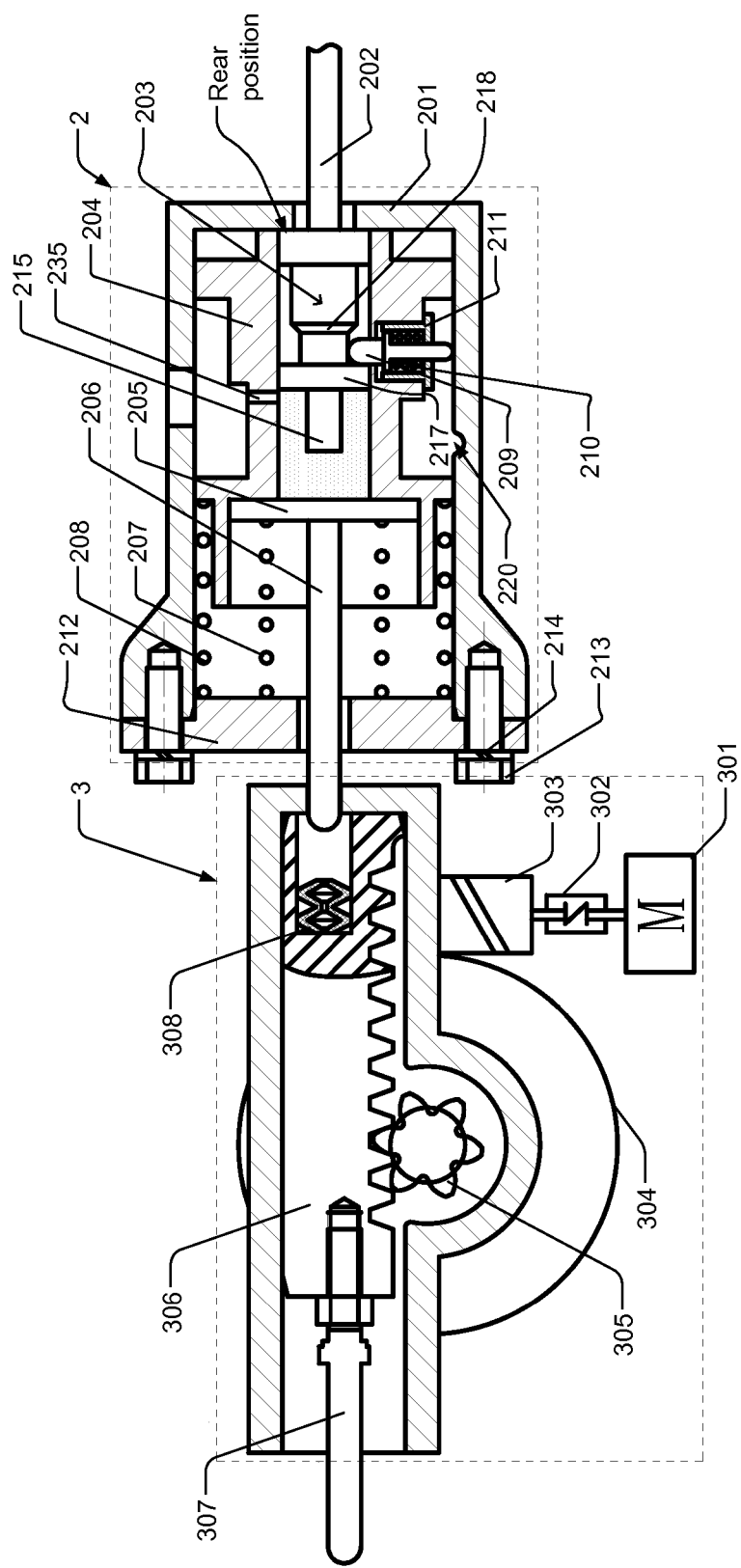
FIG. 5 is an axial cross sectional view of the manual boost cylinder and electric power assist assembly during the brake initialization mode according to the present invention.

Referring now also to FIG. 5, an axial cross sectional view of the manual boost cylinder 3 and electric power assist assembly 4 during the brake initialization mode according to the present invention is shown. When the brake pedal 1 is not depressed, the small piston 203 is situated at its rear position where the rear surface of the base 218 is in contact with the rear end of the manual boost cylinder body 201. The disc 217 of the small piston 203 is located behind the compensation orifice 235, and the compensation orifice 235 is not blocked by the disc 217 facilitating fluid communication between inside and outside the sliding cylinder body 204. The locking pin 209 is situated within the ring slot 237, and the locking pin 209 may be in contact with the disc 217.

This brake initialization mode may include the brake pedal state from completely free from depression to the extent of depression action where a vehicle brake switch (not shown) makes electric contact.

Figure 6:
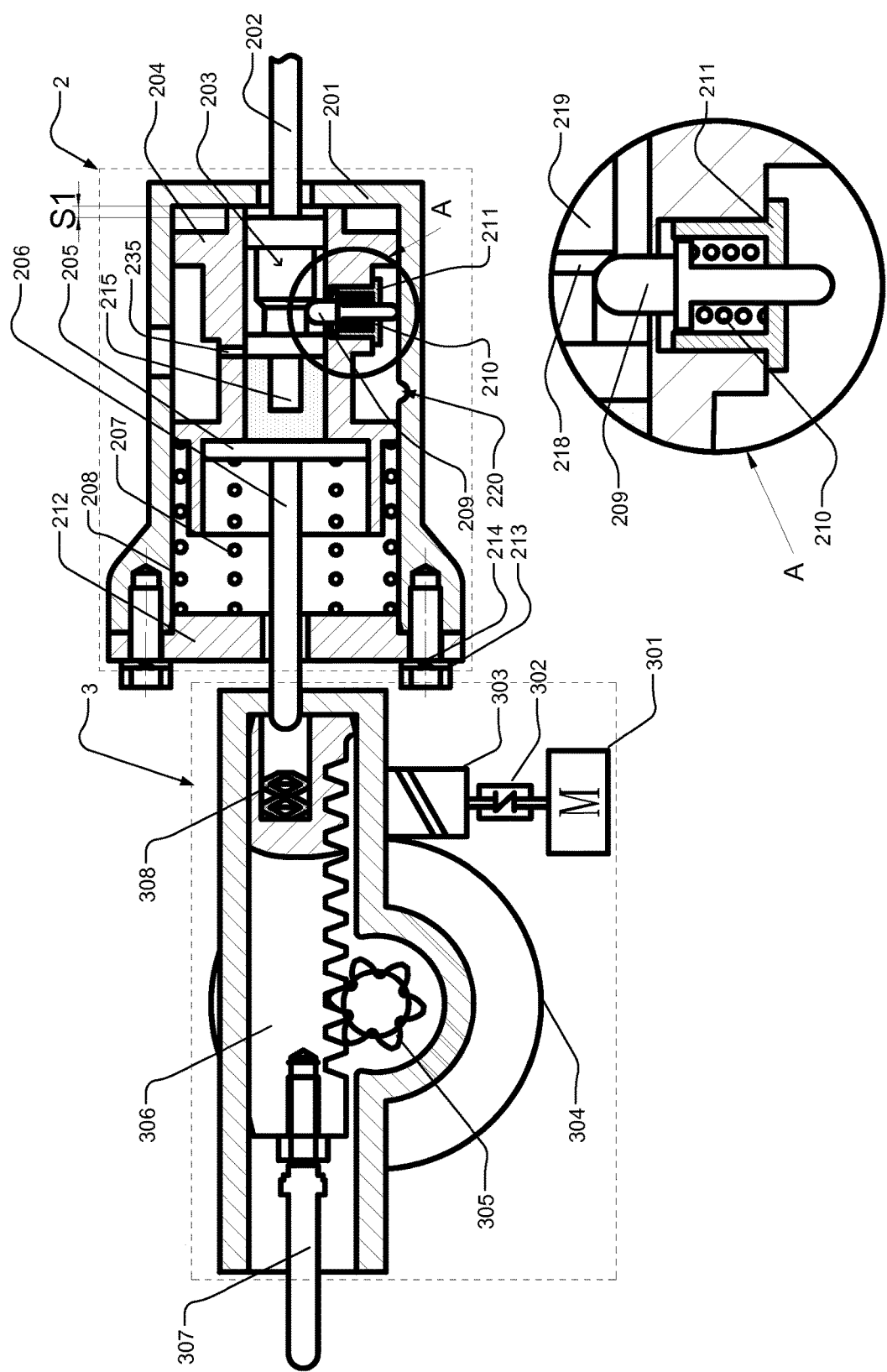
FIG. 6 is an axial cross sectional view of the manual boost cylinder and electric power assist assembly during the by-wire braking mode according to the present invention.

Referring now also to FIG. 6, an axial cross sectional view of the manual boost cylinder 3 and electric power assist assembly 4 during the by-wire braking mode according to the present invention is shown. After the brake initiation when the brake pedal travel is small, brake pedal force is exerted to the small piston 203 via the pushrod 202. The locking pin 209 remains within the ring slot 237 and is pushed by the bevel ring 218; as a result, the sliding cylinder body 204 and the small piston 203 are locked together and move at the same pace. At the same time, the sliding cylinder body 204 pushes the large piston 205 to move together. During this stage of a small-pedal-travel braking operation, the large piston rod 206 does not make contact with the rubber spring 308 inside the rack 306, the brake pedal force is not exerted on the rack 306. As a result, the braking operation is in a brake-by-wire (BBW) mode. Under the BBW mode, the brake pedal force is determined by the stiffness of the sliding cylinder returning spring 208, the large piston returning spring 207 and the brake pedal position. The front cover 212 provides front seat for the large piston returning spring 207 and the sliding cylinder returning spring 208 and is fastened on the manual boost cylinder body 201 by using bolt 213 and spring gasket 214.

In one embodiment, the returning spring and the large-piston returning spring are characterized by a relationship where a composite spring force by the large-piston return spring and the sliding cylinder return spring emulates a vehicle brake pedal force based on vehicle brake pedal travel. Therefore, the EHB system of the present invention has a natural brake emulator without incurring additional cost for such desired function.

Figure 7:
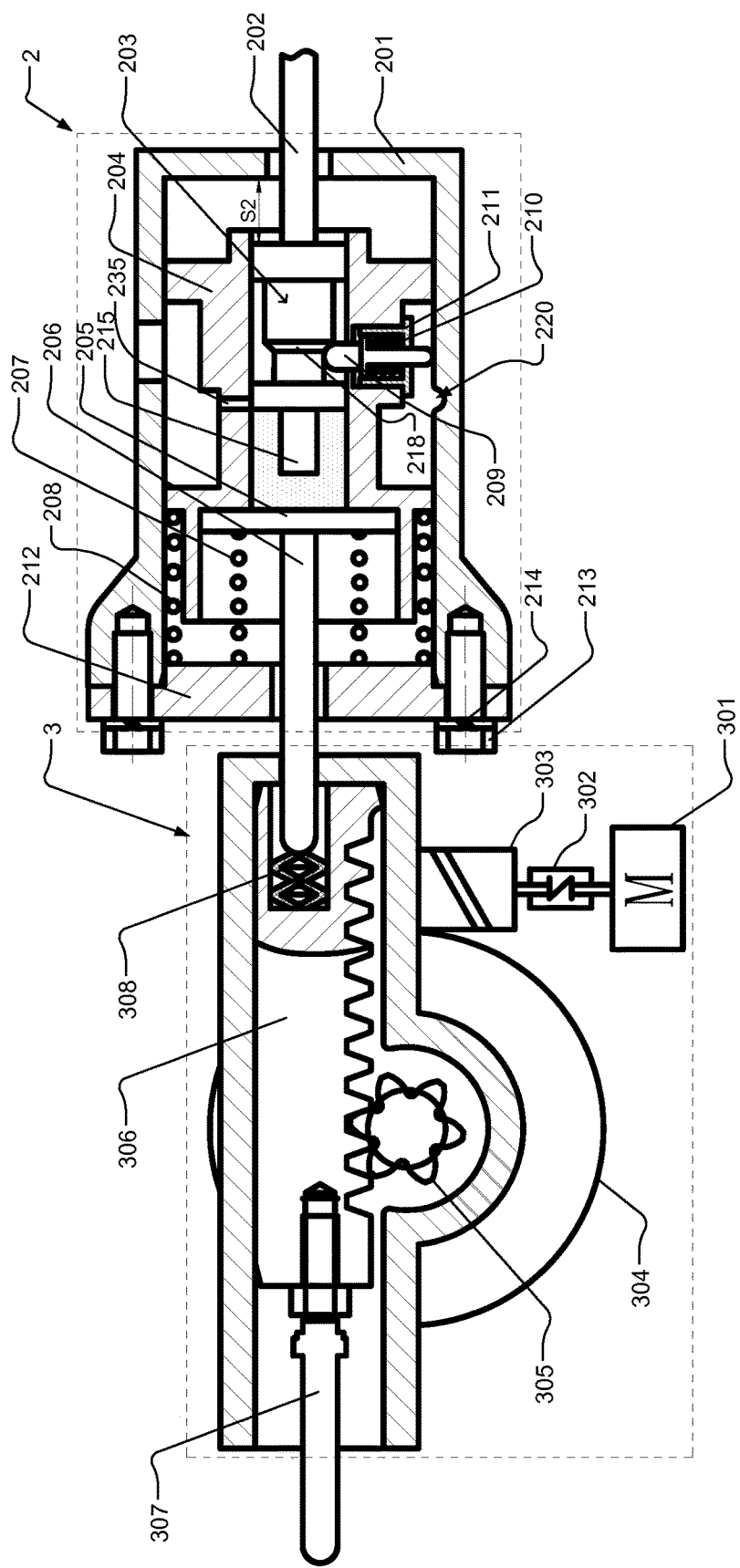
FIG. 7 is an axial cross sectional view of the manual boost cylinder and the electric power assist assembly during the electric power assist mode according to the present invention.

Referring now to FIG. 7, an axial cross sectional view of the manual boost cylinder 2 and the electric power assist assembly 3 during the electric power assist mode according to the present invention is shown. As the brake pedal travel increases the large piston rod 206 makes contact with the rubber spring 308 inside the rack 306, exerting the brake pedal force on the rack 306. During this stage of vehicle braking operation, braking force may be a combination of the brake pedal force exerted from the large piston rod 206 and the motor torque exerted from the electric motor 301. The sliding cylinder body 204 does not make contact with the front cover 212 of the manual boost cylinder 2 during this mode of electric power assist braking.

Figure 8:
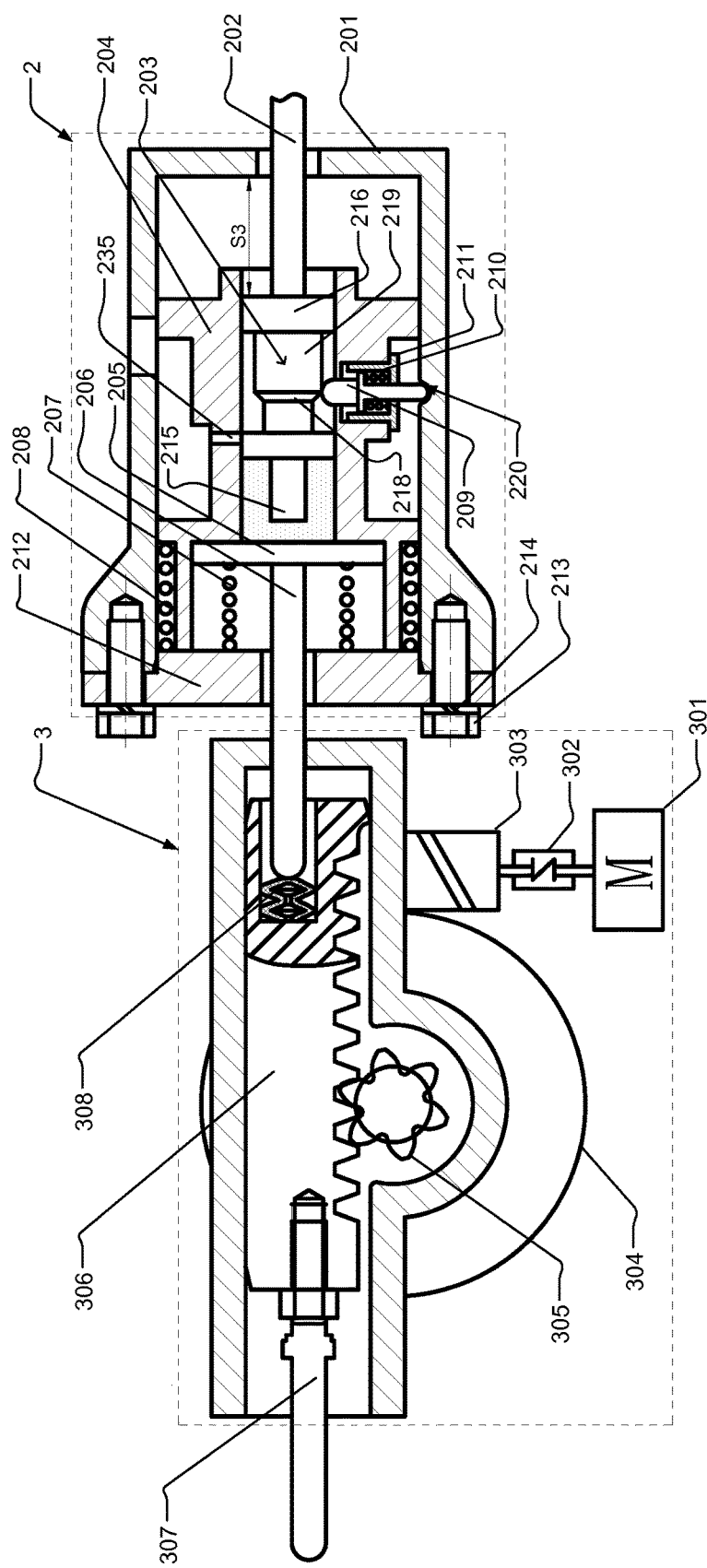
FIG. 8 is an axial cross sectional view of the manual boost cylinder and the electric power assist assembly during the transition between the electric power assist mode and the enhanced boost mode according to the present invention.

Referring now to FIG. 8, an axial cross sectional view of the manual boost cylinder 2 and the electric power assist assembly 3 during the transition between the electric power assist mode and the enhanced boost mode according to the present invention is shown. As the brake pedal travel continues to increase the sliding cylinder body 204 makes contact with the front cover 212 of the manual boost cylinder, leaving no gap between these two parts. At this point the locking pin 209 moves to the position of the indentation 220 on the manual boost cylinder body 201. Forward motion of the small piston 203 forces the locking pin 209 to travel across the bevel ring 218 and making contact with the stem 219, thus pushing the locking pin 209 into the indentation 220. In this case, the sliding cylinder body 204 and the manual boost cylinder body 201 are locked together while the small piston 203 is unlocked from the sliding cylinder body 204. As the small piston 203 is unlocked from the sliding cylinder body 204 the EHB system may enter an enhanced boost mode of braking operation.

Figure 9:
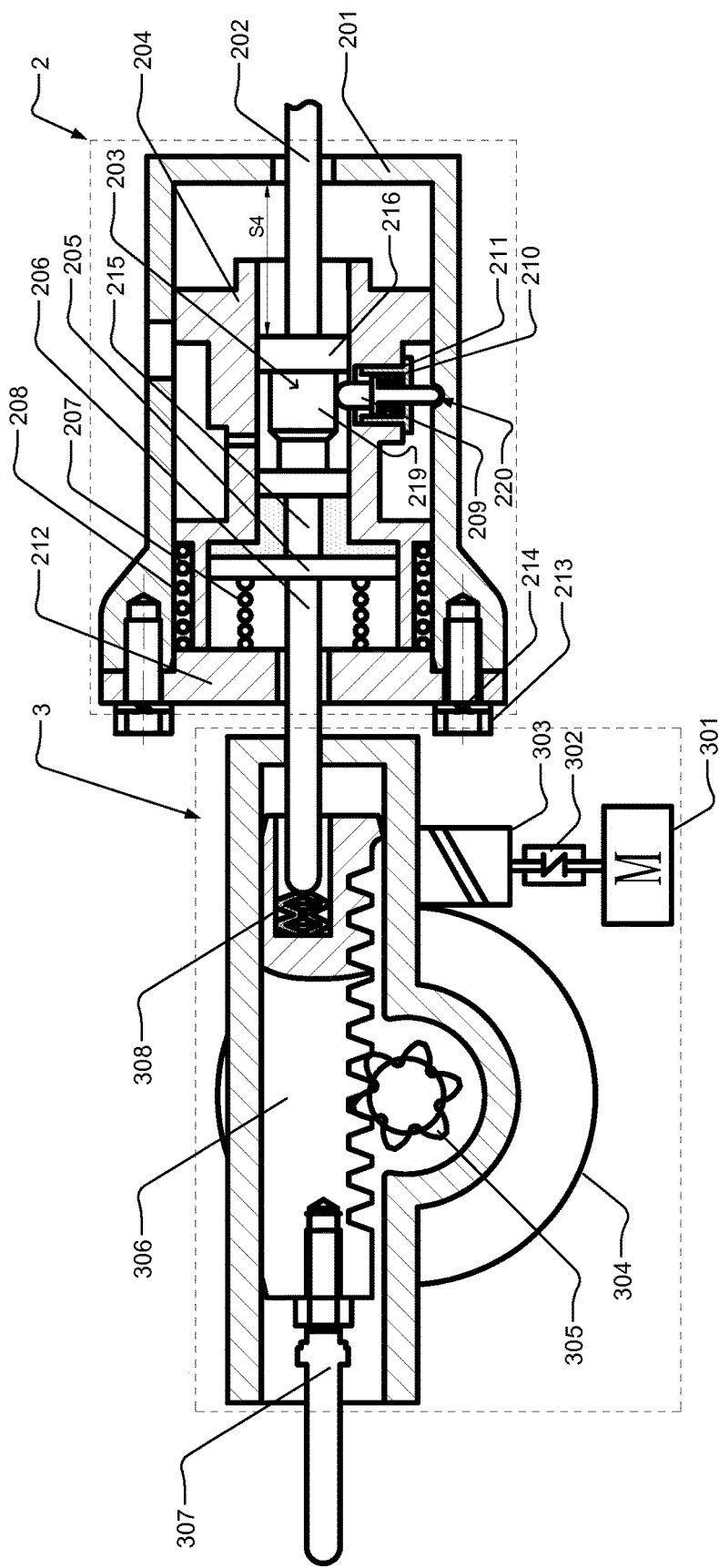
FIG. 9 is an axial cross sectional view of the manual boost cylinder and the electric power assist assembly during the enhanced boost mode according to the present invention.

Referring now to FIG. 9, an axial cross sectional view of the manual boost cylinder 2 and the electric power assist assembly 3 during the enhanced boost mode according to the present invention is shown. As the brake pedal travel continues to increase, the pushrod 202 continues to move forward. While the sliding cylinder body 204 is locked to the manual boost cylinder body 201 and the small piston 203 is unlocked, the unlocked small piston 203 is free to move forward along the longitudinal axis of the sliding cylinder body 204. The disc 217 moves forward beyond the compensation orifice 235 (FIG. 2) making the pressure chamber 236 (FIG. 2) isolated from the brake hydraulic circuit (not shown). As a result, the large piston 205 moves toward the front direction in the front cylinder 232 (FIG. 2), resulting in amplification of the force of the small piston 203 by the large piston 205, and exerting on the large piston rod 206.

Figure 10:
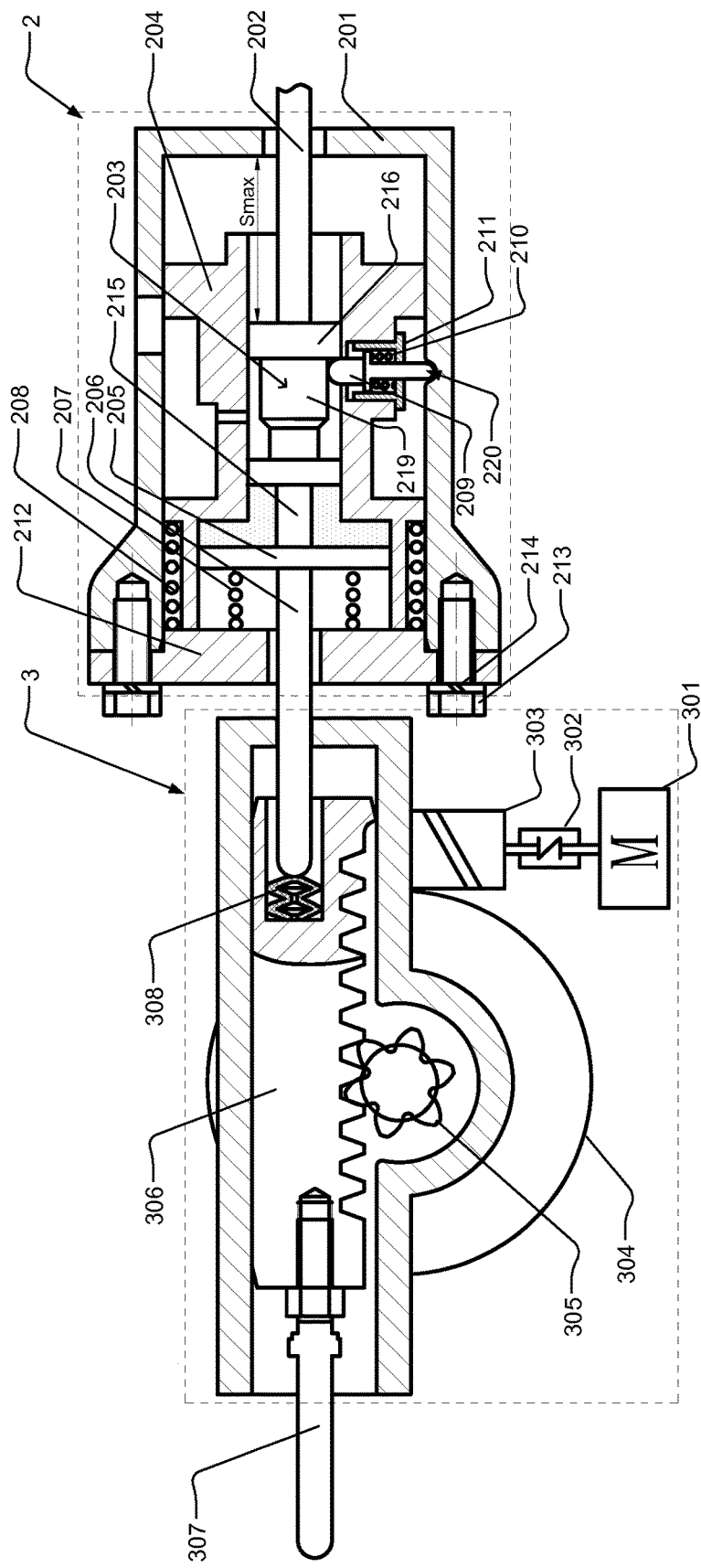
FIG. 10 is an axial cross sectional view of the manual boost cylinder and the electric power assist assembly during the fail-safe braking mode according to the present invention.

Referring now to FIG. 10, an axial cross sectional view of the manual boost cylinder 2 and the electric power assist assembly 3 during the fail-safe braking mode according to the present invention is shown. In case the manual boost cylinder 2 incurs failure, for example, caused by brake fluid leakage or even under electric power assist failure, the front tip 215 of the small piston 203 will make direct contact with the large piston 205. The brake pedal force can be exerted through the push bar 307 directly to the master cylinder 4 to perform fail-safe braking operation. Therefore, the EHB system according to the present invention does not require an additional fail-safe backup braking system with complicated diagnostic process, resulting in a reduced system cost.

Figure 11:
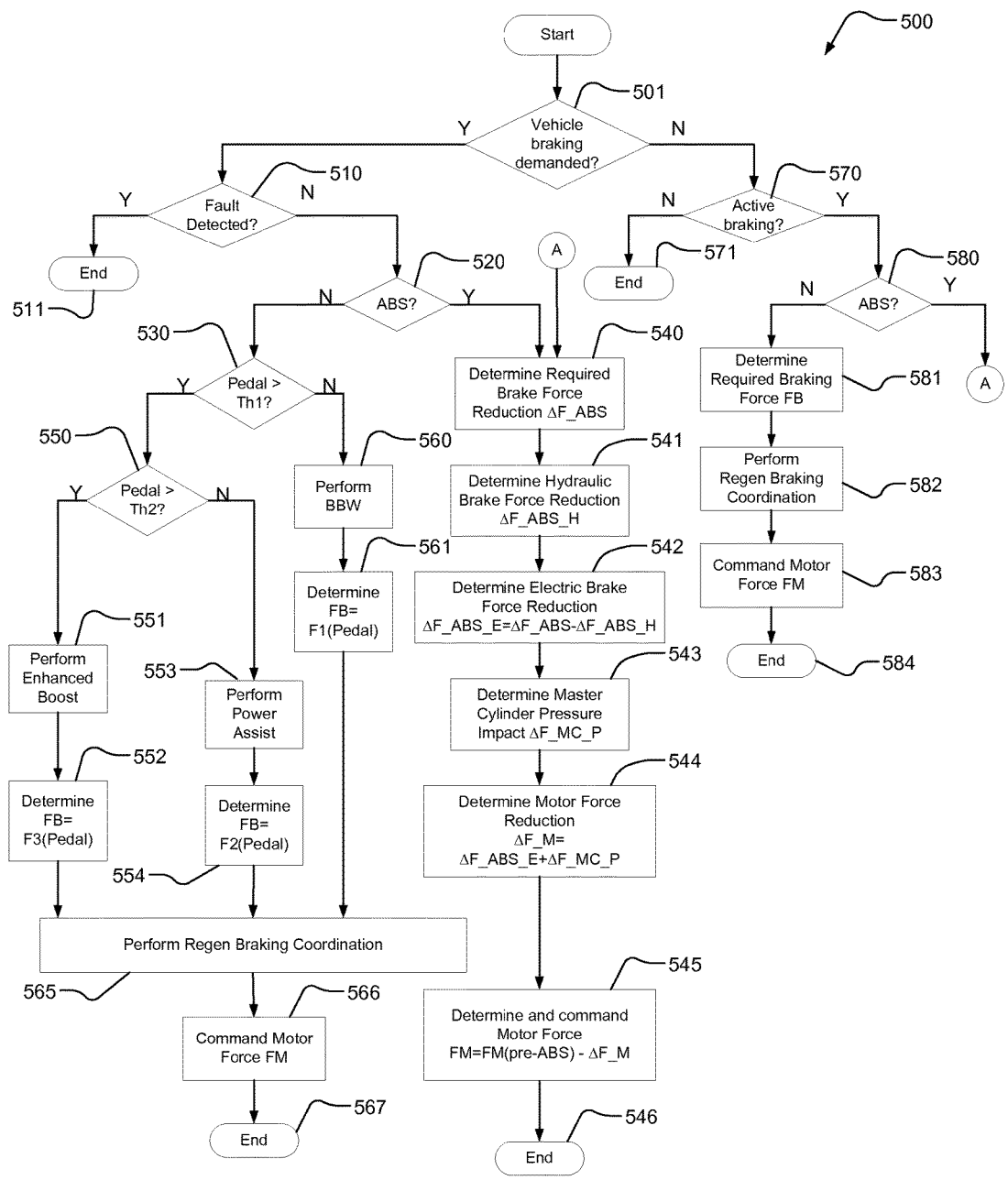
FIG. 11 is a flow diagram of a method of operating the electro-hydraulic brake system according to the present invention.

Referring now to FIG. 11, a flow diagram of a method 500 of operating the electro-hydraulic brake system 100 according to the present invention is shown. This method 500 may be performed by the ECU 10.

For each control cycle the ECU 10 may execute a control program to operate the EHB system 100. After starting of the control program execution at each cycle, the ECU 10 may go to step 501 to determine whether vehicle braking is being demanded by the driver. Driver's demand on vehicle braking may be detected based on the brake pedal switch signal from the brake pedal sensor 11. If the ECU 10 determines that the vehicle braking is demanded, the control flow will go to step 510, otherwise the control flow goes to step 570.

In step 510 the ECU 10 determines whether system fault is detected in the EHB system 100. If the answer is positive, the control flow goes to step 511 where the ECU 10 ends the control operation for the present control cycle since the EHB system 100 has a naturally built-in fail-safe operation as illustrated in FIG. 10. If there is no system fault detected in the EHB system 100, the control flow is directed to step 520.

In step 520 the ECU 10 determines whether the vehicle brake system is undergoing an antilock braking (ABS) operation. When an ABS operation status is detected, the control flow is directed to step 540; otherwise the control flow goes to step 530.

In step 530, the ECU 10 determines whether the brake pedal travel exceeds a first threshold value Th1. The threshold value Th1 distinguishes a small-pedal-travel braking operation from a large-pedal-travel braking operation. When the brake pedal travel is less than the threshold value Th1, the vehicle is undergoing a small-pedal-travel braking operation, and the control flow is directed to step 560. When the brake pedal travel is greater than the threshold value Th1, the vehicle is undergoing a large-pedal-travel braking operation, and the control flow is directed to step 550.

In step 550, the ECU 10 determines whether the brake pedal travel exceeds a second threshold value Th2. The threshold value Th2 distinguishes within the large-pedal-travel braking operation a status of electric power assist braking from a status of enhanced boost braking. When the brake pedal travel is less than the threshold value Th2, the vehicle is undergoing an electric power assist braking operation, and the control flow is directed to step 553. When the brake pedal travel is greater than the threshold value Th2, the vehicle is undergoing an enhanced boost braking operation, and the control flow is directed to step 551.

In step 551 the ECU 10 operates the EHB system 100 by performing the enhanced boost braking mode. The ECU 10 may determine for the enhanced boost braking mode a desired brake force FB in step 552. The desired brake force FB during the enhanced boost braking mode may be determined based on the pedal signal and a predetermined function F3 with a relationship:

$$FB = F3(\text{Pedal signal}) \tag{1}$$

The Eq. (1) may be implemented using real-time computation or look-up table as familiar by those skilled in the art of vehicle control. After the desired braking force FB is determined in step 552, the control flow is directed to step 565.

In step 553 the ECU 10 operates the EHB system 100 by performing the electric power assist braking mode. The ECU 10 may determine for the electric power assist braking mode a desired brake force FB in step 554. The desired brake force FB during the electric power assist braking mode may be determined based on the pedal signal and a predetermined function F2 with a relationship:

$$FB = F2(\text{Pedal signal}) \tag{2}$$

The Eq. (2) may be implemented using real-time computation. After the desired braking force FB is determined in step 554, the control flow is directed to step 565.

In step 560 the ECU 10 operates the EHB system 100 by performing the by-wire braking mode. The ECU 10 may determine for the electric power assist braking mode a desired brake force FB in step 561. The desired brake force FB during the by-wire braking mode may be determined based on the pedal signal and a predetermined function F1 with a relationship:

$$FB = F1(\text{Pedal signal}) \tag{3}$$

The Eq. (3) may be implemented using real-time computation. After the desired braking force FB is determined in step 561, the control flow is directed to step 565.

Figure 12:
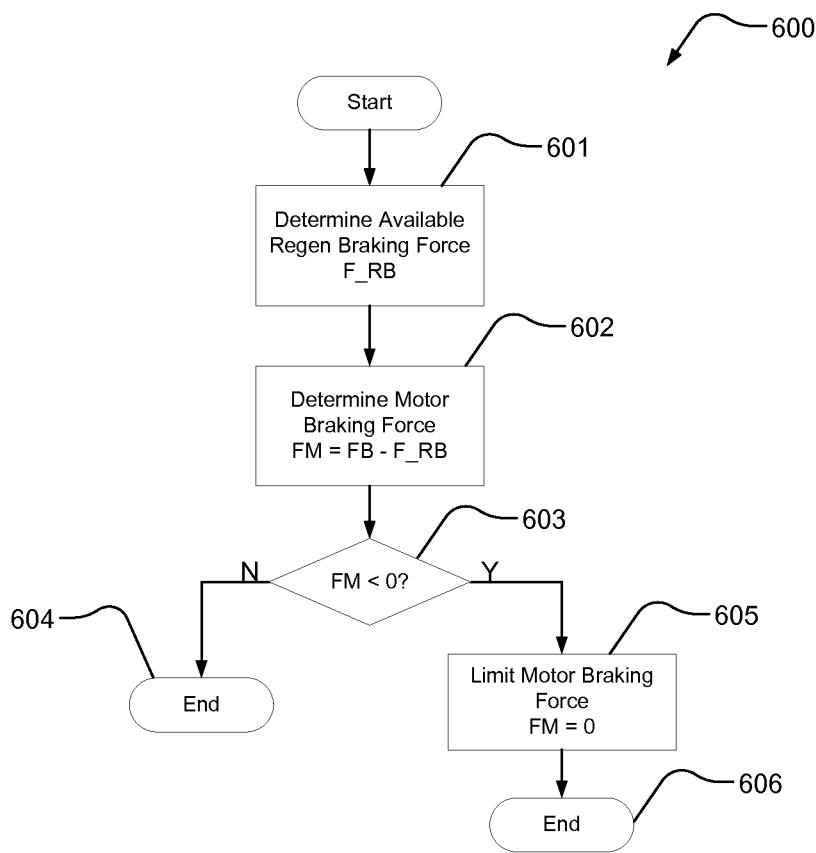
FIG. 12 is a flow diagram of a method of regenerative braking coordination for operating the electro-hydraulic brake system according to this invention.

In step 565 the required brake force FB, whether obtained from step 552, step 554 or step 561, is further processed for coordination with regenerative braking illustrated in FIG. 12. In step 566 the ECU 10 operates the electric motor 301 based on the motor force command FM obtained from the regenerative braking coordination step of 565. The ECU 10 then directs the control flow to step 567 to end for the present control cycle During vehicle brake ABS operation the ECU 10 may execute a series of control program to perform antilock braking control coordination and brake pedal feel optimization to demonstrate the benefits of the EHB system 100 according to the present invention. In step 540 the ECU 10 may determine the required brake force reduction ΔF_ABS to achieve an optimal wheel slip ratio so as to maximize the tire-road adhesion for the vehicle. In step 541, the ECU 10 may also determine the amount of brake force reduction ΔF_ABS_H arising out of the ABS hydraulic brake pressure reduction. In step 542 the ECU 10 may determine the amount of electric brake force reduction ΔF_ABS_E during ABS operation based on the required brake force reduction ΔF_ABS and the amount of brake force reduction ΔF_ABS_H arising out of the ABS hydraulic brake pressure reduction, according to the following equation:

$$\Delta F\_ABS\_E = \Delta F\_ABS - \Delta F\_ABS\_H \tag{4}$$

During an ABS braking operating transient response of hydraulic brake pressure may cause disturbance to brake pedal feel. The ECU 10 may further execute control programs in step 543 and step 544 to result in a smooth pedal feel during ABS operation. In step 543 the ECU 10 may determine a pressure impact force ΔF_MC_P occurring in the master cylinder based on the signal obtained from the master cylinder pressure sensor 6. This pressure impact force potentially to be delivered to the brake pedal 1 can be neutralized with a force adjustment in the electric power assist. In step 544 the ECU 10 may determine the total motor force reduction ΔF_M during the ABS control cycle based on the pressure impact force ΔF_MC_P and the electric brake force reduction ΔF_ABS_E, according to the following equation:

$$\Delta F\_M = \Delta F\_MC\_P + \Delta F\_ABS\_E \tag{5}$$

In step 545 the ECU 10 determines the motor force command FM based on the total motor force reduction ΔF_M from step 544 and the amount of motor force command FM (pre-ABS) prior to vehicle entering into the ABS operation, according to the following equation:

$$FM = FM(\text{pre-ABS}) - \Delta F\_M \tag{6}$$

After execution of step 545, the ECU 10 directs the control flow to step 546 to end for the present control cycle.

In step 570 while vehicle braking is not demanded by the driver, the ECU 10 may determine whether active braking is needed based on surrounding circumstances of the vehicle. For example, active braking may be needed when an adaptive cruise control (ACC) detects a deceleration of the leading vehicle; or a sudden appearance of obstacle in front of the vehicle not previously detected. If active braking is needed the ECU 10 directs the control flow to step 580; otherwise the ECU 10 directs the control flow to step 571 to end for the present control cycle.

In step 580 the ECU 10 may detect the ABS operating status of the vehicle. When the ECU 10 detects an ABS operating status the control flow is directed to step 540; otherwise the control flow is directed to step 581.

In step 581 the ECU 10 determines the required brake force FB for the circumstance the vehicle is encountering for need of active braking. In step 582 this required brake force FB is further processed for coordination with regenerative braking illustrated in FIG. 12. In step 583 the ECU 10 operates the electric motor 301 based on the motor force command FM obtained from the regenerative braking coordination step of 582. The ECU 10 then directs the control flow to step 584 to end for the present control cycle.

Referring now to FIG. 12, a flow diagram of a method of regenerative braking coordination 600 for operating the electro-hydraulic brake system 100 according to this invention is shown. After start of each control cycle the ECU 10 may execute step 601 to determine the available regenerative braking force F_RB. The available regenerative braking force may be determined based on, for example, the state of charge (SOC) of vehicle battery pack, as well as the present current limiting condition of the electrical system, and so forth.

In step 602 the ECU 10 may determine the motor braking force FM based on the required brake force FB and the available regenerative braking force F_RB to maximize the energy regeneration, according to the following equation:

$$FM = FB - F\_RB \tag{7}$$

In step 603 the ECU 10 detects whether the motor force FM so computed in Eq. (7) is a positive value. If it is a negative value, the value of FM is limited to zero in step 605; otherwise the ECU 10 directs the control flow to end for the present cycle in step 604 or step 606, respectively.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An electro-hydraulic brake system of a vehicle having brake pedal, brake pushrod actuated by the brake pedal, wheel cylinders, brake pedal sensors, on-board vehicle sensors, said electro-hydraulic brake system comprising:
    a manual boost cylinder comprising a manual boost cylinder body, said manual boost cylinder body having an inner wall defining a first cylinder, a sliding cylinder body inside the first cylinder, said sliding cylinder body having a front inner wall defining a second cylinder and a rear inner wall defining a third cylinder, a large piston reciprocably movable inside the second cylinder, a small piston that is smaller in diameter than the large piston reciprocably movable inside the third cylinder, said sliding cylinder body, small piston and large piston reciprocably movable within the manual boost cylinder body, and an interlocking means that selectively operates on locking or unlocking between the sliding cylinder body, the small piston, the large piston and the manual boost cylinder body based on a plurality of positions of the small piston within the manual boost cylinder body;
    an electric power booster comprising a rack and an electric motor;
    a master cylinder comprising a first piston, a second piston, said first and second pistons reciprocably movable inside the master cylinder, and limiter means;
    a front pushrod connecting, and reciprocably movable between, the manual boost cylinder and the electric power booster;
    a push bar connecting, and reciprocably movable between, the electric power booster and the master cylinder; and
    an electronic control unit (ECU) electrically connected to the brake pedal sensor, on-board vehicle sensor and the electric motor.

2. The electro-hydraulic brake system as in claim 1 wherein the small piston position is confined between a rear position and a front position defined by the manual boost cylinder, and wherein the interlocking means is adapted to:
    unlock the small piston, the sliding cylinder body and the manual boost cylinder body, the small piston being between the rear position and a first position (S1) in a first operating mode, said first position is between the rear position and the front position; wherein the small piston is reciprocably movable in said first operating mode while the sliding cylinder body and the large piston is stationary;
    unlock the small piston and the sliding cylinder body from the manual boost cylinder body, and lock the small piston with sliding cylinder body and the large piston in a second operating mode between the first position (S1) and a second position (S2) that is between the first position and the front position, wherein the small piston, the sliding cylinder body and the large piston are reciprocably movable together without exerting force on the rack;

unlock the small piston and the sliding cylinder body from the manual boost cylinder body, and lock the small piston with sliding cylinder body and the large piston in a third operating mode between the second position (S2) and a third position (S3) that is between the second position and the front position, wherein the small piston, the sliding cylinder body and the large piston are reciprocably movable together and exerting force on the rack;

unlock the small piston from the sliding cylinder body and lock the sliding cylinder body with manual boost cylinder body in a fourth operating mode between the third position (S3) and a fourth position (S4) where the fourth position is between the third position and the front position, wherein the small piston is reciprocably movable without contacting the large piston, while the sliding piston body and the large piston are stationary; and unlock the small piston from the sliding cylinder body and lock sliding cylinder body with manual boost cylinder body in a fifth operating mode between the fourth position (S4) and a fifth position (Smax) that is between the fourth position and the front position, wherein the small piston is reciprocably movable and making contact with, and exerting force to, the large piston, while the sliding cylinder body is stationary.

3. The electro-hydraulic brake system as in claim 2, said interlocking means comprising:
a ring slot on the small piston;
a locking pin assembly comprising
a locking pin,
a pressure spring exerting force on the locking pin, and
a spring seat adapted to receive the pressure spring and the locking pin, wherein the spring seat is installed on, and rigidly connected with the sliding cylinder body adapted to facilitate radial motion of the locking pin across the sliding cylinder body with one end of the locking pin inside the third cylinder making surface contact with the small piston and the other end of the locking pin outside the sliding cylinder body;
an indentation on the inner wall of the manual boost cylinder adapted to receive the locking pin;
a large-piston return spring continuously exerting force on the large piston toward the rear direction; and
a sliding-cylinder returning spring continuously exerting force on the sliding cylinder toward the rear direction, wherein the returning spring and the large-piston returning spring are characterized by a relationship where a composite spring force by the large-piston return spring and the sliding cylinder return spring emulates a vehicle brake pedal force based on vehicle brake pedal travel.

4. The electro-hydraulic brake system as in claim 1, said sliding cylinder body comprising:
a rear opening adapted to receive the pushrod from the brake pedal;
a front opening adapted to extend the push bar to the front direction;
a rear chamber, wherein the small piston is placed inside the rear chamber; and
a front chamber that is larger in diameter than the rear chamber, wherein the large piston is placed inside the front chamber and the large piston is connected to the front pushrod extending toward the front direction.

5. The electro-hydraulic brake system as in claim 1, said electric power booster comprising:
a rear opening adapted to receive the front pushrod extending from the manual boost cylinder, wherein the rack comprising a rear cavity opening toward the rear direction adapted to receive the front pushrod extending into the electric power booster, said rack further comprising a damper spring at the front end of the rack rear cavity; and
a front opening adapted to extend the push bar from the electric power booster to the master cylinder, wherein the rack further comprising a front cavity opening toward the front direction adapted to receive the push bar extending to the front direction.

6. The electro-hydraulic brake system as in claim 5 wherein said damper spring comprises a rubber spring.

7. The electro-hydraulic brake system as in claim 1 wherein the first piston and the second piston of the master cylinder defines a pressure chamber, said limiter means of the master cylinder comprising:
an upper limiter that restricts the pressure chamber from exceeding a predetermined maximum volume; and
a lower limiter that restricts the pressure chamber from falling below a predetermined minimum volume.

8. The electro-hydraulic brake system as in claim 7, said lower limiter comprising a bolt connected to the first piston and restraining further advancement of the first piston toward front.

9. The electro-hydraulic brake system as in claim 8, said upper limiter comprising a hood connected to the second piston and adapted to have the head of the bolt confined in a space defined by the hood and the second piston, restraining further retraction of the first piston away from the second piston.

10. The electro-hydraulic brake system as in claim 7, wherein the second piston is placed inside the master cylinder to the front direction of the first piston, and the first piston is placed partially inside the master cylinder and partially outside the master cylinder with the front portion of the first piston inside the master cylinder and the rear portion of the first piston outside the master cylinder, said rear portion of the first piston comprising a longitudinal cavity opening toward the rear direction to receive the push bar extending from the electric power booster, wherein the longitudinal cavity has a cone shape having a larger diameter at the cavity opening than at the cavity tip.

11. The electro-hydraulic brake system as in claim 1, said small piston comprising:
a disc adapted to form hydraulic sealing with the rear inner wall of the sliding cylinder body;
a tip connected to the disc at the front of the disc;
a bevel ring located at the opposite side of the disc from the tip;
a ring slot formed between the bevel ring and the disc;
a base at the rear of the small piston, wherein the diameter of said base is essentially the same as the diameter of the disc; and
a stem connecting the base and the bevel ring, wherein the diameter of said stem is smaller than the diameter of the base.

* * * * *